US008708796B2

(12) United States Patent
Baumgartner et al.

(10) Patent No.: US 8,708,796 B2
(45) Date of Patent: Apr. 29, 2014

(54) GAMING MACHINE PROVIDING FREE GAME POTS TO REWARD EXTENDED PLAYING

(75) Inventors: Christian Baumgartner, Oberndorf (AT); Andreas Zehetner, Graz (AT)

(73) Assignee: Spielo International Canada ULC, Moncton, New Brunswick (CA)

( * ) Notice: Subject to any disclaimer, the term of this patent is extended or adjusted under 35 U.S.C. 154(b) by 1621 days.

(21) Appl. No.: 12/015,421

(22) Filed: Jan. 16, 2008

(65) Prior Publication Data

US 2009/0181759 A1 Jul. 16, 2009

(51) Int. Cl.
*A63F 13/00* (2014.01)
*G07F 17/32* (2006.01)
*G07F 17/34* (2006.01)

(52) U.S. Cl.
CPC ............ *G07F 17/32* (2013.01); *G07F 17/3258* (2013.01); *G07F 17/3267* (2013.01); *G07F 17/34* (2013.01)
USPC ............................................... 463/20; 463/16

(58) Field of Classification Search
CPC ... G07F 17/32; G07F 17/326; G07F 17/3267; G07F 17/34; G07F 17/3244; G07F 17/3258
USPC ...................................................... 463/16–20
See application file for complete search history.

(56) References Cited

U.S. PATENT DOCUMENTS

2004/0082373 A1 4/2004 Cole et al.
2007/0213114 A1 * 9/2007 Caspers et al. .................. 463/16

FOREIGN PATENT DOCUMENTS

WO 2007082336 A1 7/2007

* cited by examiner

*Primary Examiner* — Michael Cuff
(74) *Attorney, Agent, or Firm* — Patent Law Group LLP; Brian D Ogonowsky

(57) ABSTRACT

For each bet on a slot machine game, such as a conventional reel-type game, a fraction of a free game is stored in the machine's memory, where the stored free game fraction is associated with the amount bet. Thus, each possible bet amount option is associated with a particular free game pot in memory. Each paid-for play may accumulate any free game fraction, such as 1/10, 1/5, 1/4, 1/3, etc. The player is notified of the accumulated free games on a video screen so the player wants to keep playing so as to not waste any stored free game fractions. The player may play stored whole free games at any time by actuating a button. The free game pots may be easily added to existing games without significant regulatory involvement and does not affect the casino's profit.

20 Claims, 3 Drawing Sheets

GAMING MACHINE PROVIDING FREE GAME POTS TO REWARD EXTENDED PLAYING

FIELD OF THE INVENTION

This invention relates to gaming machines and, in particular, to providing players fractions of free games for each game played.

BACKGROUND

Common slot machines randomly select and display an array of symbols on actual or virtual reels, then grant an award to a player based on the occurrence of winning symbol combinations across activated paylines. Common symbol displays include a 5 column by 4 row (5×4) matrix, a 5×3 matrix, a 3×3 matrix, and a 3×1 matrix.

There are typically a plurality of bet amount options, including a minimum bet (e.g., 1 credit), a maximum bet (e.g., credits needed to play all paylines at a maximum amount per payline), and bets in-between. Casinos like higher bets per play since more profit is made.

The present invention may apply to other types of gaming machines such as video poker or any other game.

Slot machine manufacturers and casinos have created many different ways to encourage players to bet more, play longer, and play certain machines. Such ways frequently involve designing the game to contain special features such as a bonus game, or the casino may provide an incentive to the players to play more such as awarding complimentary services for play in excess of a certain amount. New or revised game programs typically require a long time to develop and test and require approval by the appropriate regulatory agency. And, casino incentives cost the casino money.

What is needed is a technique that encourages players to play slot machines for a longer time and to bet higher amounts per game, where the technique does not require changes to the game itself and does not cost the casino money.

SUMMARY

For each bet on a slot machine game, such as a conventional reel-type game, a fraction of a free game is stored in the machine's memory, where the stored free game fraction is associated with the amount bet. Thus, each possible bet amount option is associated with a particular free game pot in memory. Each paid-for play may accumulate ¼ of a free game or any other fraction, such as 1/10, ⅕, ⅓, etc.

For example, if the player bet one credit for a game, ¼ of a free game credit will be stored in the "1 credit free game pot." After the player plays three more 1-credit games (i.e., accumulates a whole free game), the player will receive a free 1-credit game (i.e., the paylines and awards will be that for a paid 1-credit game). Similarly, if the player bets 10 credits for a game, ¼ of a free game credit will be stored in the "10-credit free game pot." After the player plays three more 10-credit games, the player will receive one free 10-credit game.

The player is notified of the accumulated free games on a video screen, a meter, or other type of display, so the player has a desire to keep playing so as to not waste any stored free game fractions.

The player may play stored whole free games at any time by pressing an actual button or a virtual button on a touch screen. In another embodiment, as soon as a whole free game is accumulated, it is automatically played as the next game after informing the player of the free game. In another embodiment, the stored free games may be transferred to other gaming machines via a network or encoded on a paper ticket when the player cashes out.

In order for the free games to not reduce the profitability of the machine, the payout percentage (i.e., average payout/pay-in ×100% for each game) for the paid games is slightly reduced so that the overall target payout percentage for the machine is maintained when including the free games.

As an incentive to bet the maximum bet for each game, the fraction of a free game achieved for each paid game may be greater than the fraction for a smaller bet game. In another embodiment, the free game fraction is only applicable to a maximum bet, thereby encouraging the players to bet the maximum. Other incentives for playing increased bets are described herein.

Further, there may be special free game multiplier symbols introduced into the reel strips such that the occurrence of a multiplier symbol multiplies the stored free games associated with the game's bet amount. Other symbols may be introduced that increment a free game pot.

The free games may also be stored for a video poker game or other gambling game.

As seen, various techniques involving awarding fractions of free games associated with the amount bet are described that entail no changes to the underlying game itself, and the target payout percentage is not affected. Therefore, the free game pot invention may be easily added to existing games without significant regulatory involvement and does not affect the casino's profit. The addition of the free game feature causes potential players to be attracted to the machines and rewards the player for long term play.

DETAILED DESCRIPTION

Although the invention can typically be implemented by installing a software program in most types of modern video gaming machines, one particular gaming machine platform will be described in detail.

Figure 1:
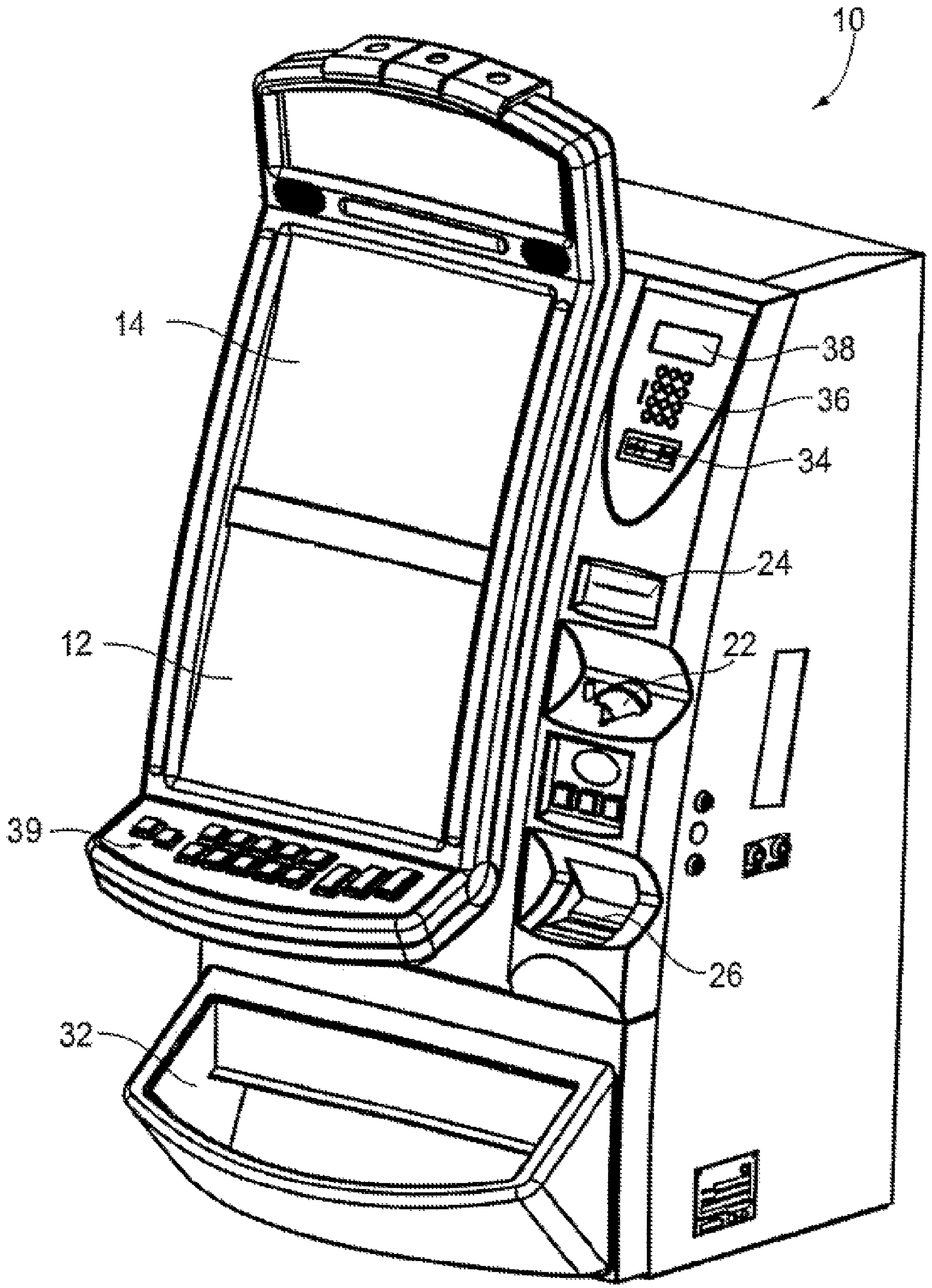
FIG. 1 is a perspective view of one type of gaming machine that is programmed to carry out the inventive technique.

FIG. 1 is a perspective view of a gaming machine 10 that incorporates the present invention. Machine 10 includes a display 12 that may be a thin film transistor (TFT) display, a liquid crystal display (LCD), a cathode ray tube (CRT), or any other type of display. A second display 14 provides game data or other information in addition to display 12. Display 14 may provide information such as an advertisement for the game, the rules of the game, pay tables for each bet amount, the different blocks of symbol positions associated with their associated bet amount to determine winning symbol combinations, or other information, or may even display the main game or the bonus games along with display 12. Alternatively, the area for display 14 may be a display glass for conveying relevant information.

Display 12 or 14 may have a touch screen lamination that includes a transparent grid of conductors. Touching the screen changes the capacitance between the conductors, and thereby the X-Y location of the touch may be determined. The processor associates this X-Y location with a function to be performed. Such touch screens are very well known in the field of slot machines, and a detailed description of them is not required.

A coin slot 22 accepts coins or tokens in one or more denominations to generate credits within machine 10 for playing games. An input slot 24 for an optical reader and printer receives machine readable printed tickets and outputs printed tickets for use in cashless gaming. A bill acceptor 26 accepts various denominations of banknotes.

A coin tray 32 receives coins or tokens from a hopper upon a win or upon the player cashing out.

A card reader slot 34 accepts any of various types of cards, such as smart cards, magnetic strip cards, or other types of cards conveying machine readable information. The card reader reads the inserted card for player and credit information for cashless gaming. The card reader may also include an optical reader and printer for reading and printing coded barcodes and other information on a paper ticket.

A keypad 36 accepts player input, such as a personal identification number (PIN) or any other player information. A display 38 above keypad 36 displays a menu for instructions and other information and provides visual feedback of the keys pressed.

Player control buttons 39 include any buttons needed for the play of the particular game or games offered by machine 10 including, for example, one or more bet buttons, a repeat bet button, a spin reels button, a maximum bet button, a cash-out button, a display payout tables button, select icon buttons, free game play buttons, and any other suitable button. Buttons 39 may be replaced by a touch screen with virtual buttons. In one embodiment, to simplify betting, there are only a limited number of betting options, such as five, and each betting option has a separate button 39.

Figure 2:
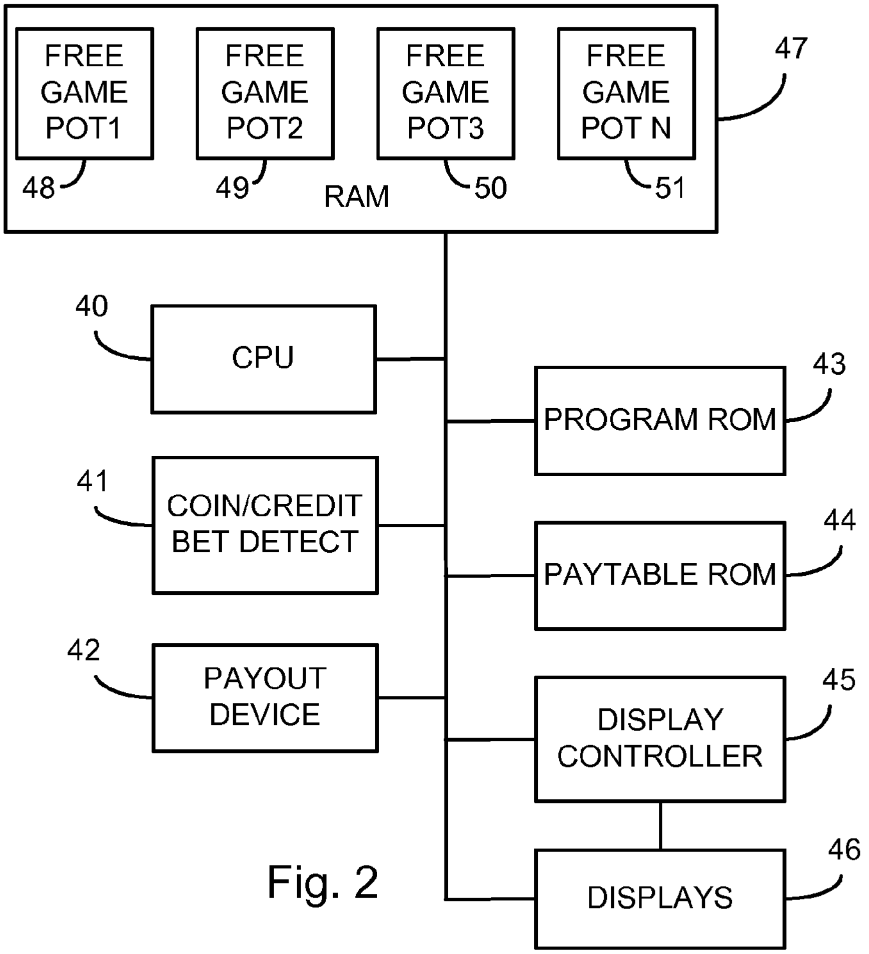
FIG. 2 is a block diagram showing the basic functional units in the gaming machine of FIG. 1.

FIG. 2 illustrates basic circuit blocks in a suitable gaming device. A control unit (CPU 40) runs a gaming program stored in a program ROM 43 (e.g., a CD). A coin/credit detector 41 enables the CPU 40 to initiate a next game. A paytable ROM 44 detects the outcome of the game and identifies awards to be paid to the player. A payout device 42 pays out an award to the player in the form of coins upon termination of the game or upon the player cashing out. A payout may also be in the form of a coded paper ticket, credits on a smart card or magnetic strip card, or in any other form. A display controller 45 receives commands from the CPU 40 and generates signals for the various displays 46. If a display 46 is a touch screen, player commands may be input through the display screen into the CPU 40. All components may be connected to a single bus.

A RAM 47 stores all or portions of the game program (downloaded from program ROM 43) while the machine is being used and stores a plurality of free game pots 48-51, one pot per bet amount option. Each pot is actually a dedicated memory location that stores the accumulated number of free games associated with that bet amount. The CPU 40 interacts with the RAM 47 when the RAM 47 is loaded with the pertinent game software. The CPU 40 calculates the free game pot amounts and stores the accumulated amounts in the free game pots.

Operation of Gaming Machine Incorporating Invention

The operation of the gaming machine of FIG. 1 will be described with respect to the sample screen display of FIG. 3 and the flowchart of FIG. 4.

Figure 3:
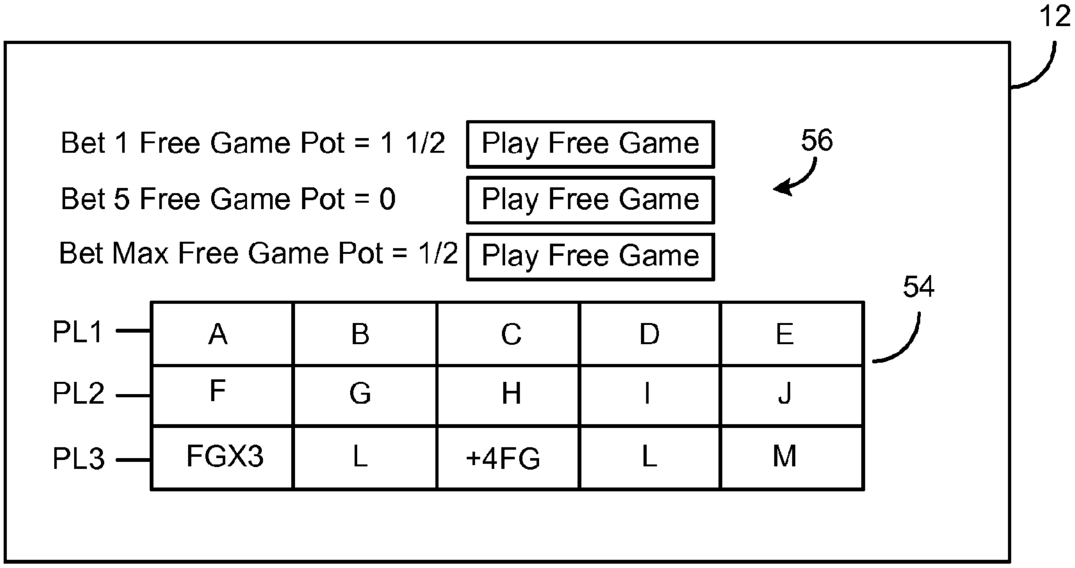
FIG. 3 illustrates an example of a screen showing a 5×3 matrix of symbols and a display of the stored free games in the free game pots.
Figure 4:
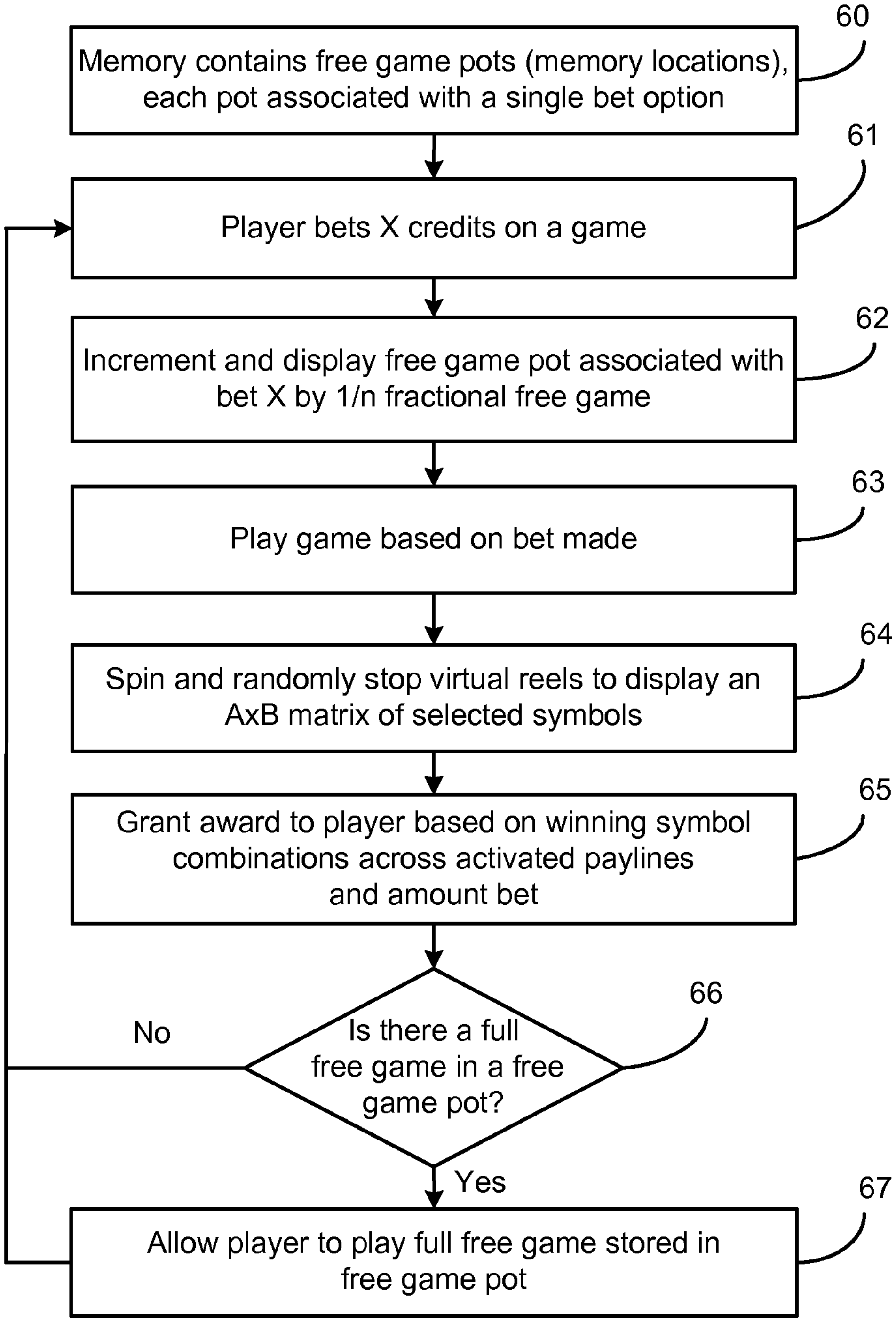
FIG. 4 is a flow chart of the basic method carried out using the new technique.

As an initial matter, the game program or a separate program controlling CPU 40, or a hardware circuit, causes the RAM 47 to dedicate certain memory locations to accumulating free games associated with each bet option (step 60 in FIG. 4). Each such memory location is referred to as a free game pot. For simplicity, it is assumed that there are only three betting options for playing a single game: 1 credit, 5 credits, and a maximum bet. A game may be the rotation and random stoppage of five virtual reels 54 displaying a 5×3 matrix of symbols. Sample symbols are shown. Awards are based upon whether the symbol combinations across paylines are winning combinations. Only three horizontal paylines, PL1, PL2, PL3, are shown in FIG. 3 for simplicity. Normally, there would be many more paylines. Increasing a bet typically adds paylines or multiplies an award for a winning combination of symbols, or both.

The player initially deposits money into the gaming machine, either by cash, ticket, or download, to accumulate credits for later betting. In step 61, the player then makes a wager for a single game, such as 1 credit, 5 credits, or a max bet. It will be assumed that a bet of 1 credit is wagered for the game.

In step 62, a free game pot associated with the bet amount made is incremented by a fraction of a free game, and the free game pots are displayed. The fraction may be 1/10, 1/5, 1/4, 1/3, or any other fraction. It will be assumed that the fraction is 1/4. FIG. 3 illustrates that the display screen 12 of FIG. 1 has incremented the Bet 1 Free Game Pot by 1/4 so that the player has accumulated 1 1/2 free games, after previously playing five games betting one credit per game. The display of the stored quantity of free games in each pot may be a continuous display or may be displayed between games or upon the player pressing a button to display the free game pots.

In step 63, the game is initiated by pressing a "spin reels" button or pulling a handle, and the reels randomly stop to display an A×B matrix of symbols (step 64). FIG. 3 shows a sample 5×3 matrix of displayed symbols.

In step 65, any award is granted based on winning symbol combinations across activated paylines and based on the amount bet. In some types of games, an increased bet increases the award proportionally. In other types of games, an increased bet increases the number of activated paylines and may not affect the award amount. In any event, an increased bet is beneficial to the player due to increased awards or increased odds of winning.

FIG. 3 also illustrates that certain symbols in the A×B matrix may be related to the free game pots. One symbol, shown as +4FG, adds four free games to the pot associated with the amount bet. Symbols may award any fractions of free games or whole free games. Another symbol shown in FIG. 3 is a FGX3 symbol, which multiplies the stored free games for the associated bet by three times. Any multiple may be used.

In step 66, it is determined whether the player has any full free games stored in any of the free game pots 48-51 in FIG. 2. If not, the process reverts back to step 61, where the player must bet again to play again.

In step 67, if there are one or more full free games stored in the pots, then the player may elect to play any of the games by pressing a "play free games" button 56. FIG. 3 shows a virtual button for each free game pot that the player touches to play a free game from that pot. Touch screens are well known in the field of slot machines. The free game is then played using the bet amount associated with the pot, and the full free game is deducted from the pot. The player may play any number of the stored full free games. In FIG. 3, since only the Bet 1 Free Game Pot contains a full free game, the player may only play a Bet 1 free game.

After the player cashes out of the machine by pressing a cash-out button, the free game pots are preferably reset to zero or another starting point to discourage non-players from waiting to play machines with stored fractions of free games.

The invention encourages extended play by the player since the player does not want to leave any partial free games in the pots. Also, the invention encourages betting a maximum amount since the free games are played using the bet amount associated with the pot. A free game played from the Bet Max Free Game Pot is the most valuable free game since the awards or odds of winning are generally higher than those of free games from other pots.

In one embodiment, there is only a free game pot for the maximum bet, or for certain bets greater than the minimum bet, to encourage the player to bet more than the minimum bet. To further encourage players to bet more than the minimum bet, higher bet amounts increment their associated free game pots by higher fractions of free game. For example, a minimum bet may add ⅕ free game for each paid game, and a maximum bet may add ¼ free game for each paid game. Additionally, certain symbols on the virtual reel strips may increment a free game pot only when the player makes a maximum bet or other increased bet. Such symbols may only be included in a reel strip if the player makes the maximum bet or other increased bet.

Further, even though the awards for the paid games are reduced to take into account awards granted during the free games, to maintain an overall target average payout percentage, the player perceives the free games as an additional award, so the slot machines are more popular than conventional machines. The award amounts are easily controlled by programming the paytable ROM 44 in FIG. 2.

An additional benefit of the invention is that the game played need not be affected by the free game feature. In other words, the reel strips, reel stop selection software, winning combinations, and odds of winning an award may be unaffected by the addition of the free game feature. This allows the feature to be a simple software add-on that does not change the game itself. Hence, there may be minimum regulatory approval for the add-on. Only the paytable needs to be changed to maintain a target payout percentage, and the steps 62, 66, and 67 need to be added to the process flow.

The various techniques described are easily implemented by a software programmer storing a program in the program ROM 43 in FIG. 2. The CPU 40 carries out the program, as would be understood by those skilled in the art.

The technique may be carried out on a stand-alone machine or on a machine connected to a server.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a gaming device comprising:

providing a plurality of betting amount options to a player, each betting amount option being uniquely associated with a predetermined different free game pot prior to any game being played, there being a plurality of free game pots, each free game pot being a stored quantity of free games;

displaying the quantity of free games stored in at least each free game pot that contains any fraction of a free game;

detecting a bet by the player in accordance with one of the betting amount options;

incrementing the free game pot associated with the bet detected by a predetermined fraction of a free game, the fraction being less than one, incrementing the free game pot after detecting a bet being irrespective of any game played based on the bet detected;

playing a game based on the bet detected;

granting any awards to the player depending on an outcome of the game;

allowing the player to play any full free games stored in the free game pots, where a free game played from its free game pot is played as if the player paid for the game using the same bet associated with the free game pot; and decrementing a full free game from its free game pot if the player decides to play a free game.

2. The method of claim 1 wherein the game comprises spinning and randomly stopping virtual reels to display symbols in a matrix of symbol positions, and wherein granting any awards to the player comprises granting awards based upon combinations of symbols displayed in the matrix.

3. The method of claim 1 wherein different bet amounts increment an associated free game pot by a same fraction of a free game.

4. The method of claim 1 wherein different bet amounts increment an associated free game pot by a different fraction of a free game.

5. The method of claim 1 wherein the player is allowed to play a free game stored in a free game pot at any time.

6. The method of claim 1 wherein the outcome of the game includes awards that increment one or more of the free game pots.

7. The method of claim 1 wherein the free game pots are continuously displayed to the player.

8. The method of claim 1 further comprising resetting the free game pots when the player cashes out.

9. The method of claim 1 wherein every possible betting amount option is associated with a different free game pot.

10. The method of claim 1 wherein not every possible betting amount option is associated with a free game pot.

11. The method of claim 1 wherein a bet higher than a minimum bet increments an associated free game pot with a fraction of a free game that is greater than any fraction of a free game that increments a free pot when betting the minimum bet.

12. The method of claim 1 wherein there are at least three free game pots.

13. The method of claim 1 further comprising transferring stored free game quantities in the free game pots to other gaming machines.

14. A gaming machine comprising:

a display device for displaying a game; and at least one programmed processor for carrying out a game program and controlling the display, the processor carrying out the method comprising:

providing a plurality of betting amount options to a player, each betting amount option being uniquely associated with a predetermined different free game pot prior to any game being played, there being a plurality of free game pots, each free game pot being a stored quantity of free games;

displaying the quantity of free games stored in at least each free game pot that contains any fraction of a free game;

detecting a bet by the player in accordance with one of the betting amount options;

incrementing the free game pot associated with the bet detected by a predetermined fraction of a free game, the fraction being less than one, incrementing the free game pot after detecting a bet being irrespective of any game played based on the bet detected;

playing a game based on the bet detected;

granting any awards to the player depending on an outcome of the game;

allowing the player to play any full free games stored in the free game pots, where a free game played from its free game pot is played as if the player paid for the game using the same bet associated with the free game pot; and decrementing a full free game from its free game pot if the player decides to play a free game.

15. The machine of claim 14 wherein the game comprises spinning and randomly stopping virtual reels to display symbols in a matrix of symbol positions, and wherein granting any awards to the player comprises granting awards based upon combinations of symbols displayed in the matrix.

16. The machine of claim 14 wherein different bet amounts increment an associated free game pot by a same fraction of a free game.

17. The machine of claim 14 wherein different bet amounts increment an associated free game pot by a different fraction of a free game.

18. The machine of claim 14 wherein the player is allowed to play a free game stored in a free game pot at any time.

19. The machine of claim 14 wherein the outcome of the game includes awards that increment one or more of the free game pots.

20. The machine of claim 14 wherein not every possible betting amount option is associated with a free game pot.

* * * * *